United States Patent [19]

Lazar et al.

[11] 3,917,447
[45] Nov. 4, 1975

[54] DYE COMPOSITIONS

[75] Inventors: Remus I. Lazar, Berwyn; Richard C. Reichel, Chicago, both of Ill.

[73] Assignee: Velsicol Chemical Corporation, Chicago, Ill.

[22] Filed: May 14, 1974

[21] Appl. No.: 469,159

[52] U.S. Cl. .................................. 8/92; 8/173
[51] Int. Cl.² ................................. D06P 3/54
[58] Field of Search ......................... 8/92, 173

[56] References Cited
UNITED STATES PATENTS

| | | | |
|---|---|---|---|
| 2,881,045 | 5/1959 | Mecco et al. | 8/92 |
| 3,203,753 | 8/1965 | Sherburne | 8/83 |
| 3,532,454 | 10/1970 | Fuhr et al. | 8/92 |

*Primary Examiner*—V. P. Hoke
*Attorney, Agent, or Firm*—Robert J. Schwarz; Dietmar H. Olesch

[57] ABSTRACT

This invention discloses a dye composition comprising one part by weight of a disperse dye and from one to twenty parts by weight of a dye assist consisting of a mixture of butyl benzoate and a compound of the formula

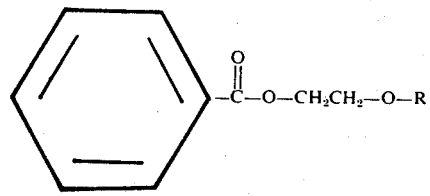

wherein R is alkyl of up to 4 carbon atoms, in a weight ratio of from 4:1 to 1:4.

5 Claims, No Drawings

DYE COMPOSITIONS

This invention relates to dye compositions which are useful in the dyeing of polyester fibers.

The art of dyeing is a complex procedure requiring a variety of techniques and chemicals. The dyeing of polyester fibers is typically carried out with the use of disperse dyes. Disperse dyes are water-insoluble, colored organic substances which can be dispersed in water in a very fine particle size and are well known in the art. Such dyes are usually not used by themselves but are used in combination with a dye assist, also referred to as a dye carrier. The use of a dye assist results in a substantial improvement in the uniformity of dyeing as well as an increase in the depth or saturation of color achieved. Thus, the use of a dye assist permits the obtainment of a particular depth of color with a lower concentration of dye.

It has now been found that a particular mixture of two compounds yields a dye assist which in combination with a disperse dye results in a dye composition yielding color intensities in polyester fibers unobtainable with the individual compounds at the same concentration. Moreover it has been found that whereas one of the components of the dye assist mixture possesses objectionable odor both at room temperature and at dyeing temperatures the combination of compounds of this invention results in a dye assist which is virtually odorless even at elevated temperatures.

Accordingly, an embodiment of the present invention resides in a dye composition comprising one part by weight of a disperse dye and from one to twenty parts by weight of a dye assist consisting of a mixture of butyl benzoate and a compound of the formula

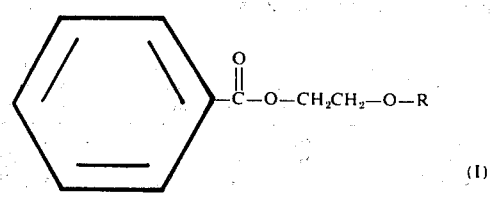

(I)

wherein R is alkyl of up to 4 carbon atoms, in a weight ratio of from 4:1 to 1:4.

Compounds of formula I are methyl cellosolve benzoate, ethyl cellosolve benzoate, propyl collosolve benzoate and butyl cellosolve benzoate. Both butyl benzoate as well as the compounds of formula I are known compounds and are readily available as articles of commerce.

As heretofore stated the dye assists of the present invention are useful in dye compositions containing disperse dyes. Exemplary disperse dyes which can be utilized in the dye compositions of this invention are CI Disperse Red 88 (Genacron Red B, GAF); CI Disperse Blue 79 (Eastman Navy Blue 2R-LSW); CI Disperse Yellow 42, C.I. No. 10338 (Genacron Yellow GGLL); (Genacron Blue 3 GL); CI Disperse Red 88 (Eastman Red B); CI Disperse Blue 27, C.I. No. 60767 (Eastman Blue GLF); CI Disperse Blue 60 ("Latyl" Brilliant Blue BG, Du Pont).

The dye compositions of the present invention can be used to dye polyester fibers by standard procedures used in the art. For example, the dye compositions can be applied by means of an immersion operation. The actual process conditions such as temperature, pH, etc., are substantially the same as those employed in the art for the dyeing of polyester fibers.

Similarly, the dye compositions of this invention can contain other additives normally used in dyeing with disperse dyes. For example, emulsifiers or surfactants can be used in the dye compositions. Typically anionic and/or nonionic surface active agents in an amount of from about 5 to about 25 weight percent of the dye assist can be suitably employed.

For practical use in dyeing polyester fibers the dye compositions of this invention are incorporated into aqueous dye baths. Such dye baths can be prepared by first dispersing the dyestuff in water. Buffers and other desired additives can then be added to the dye dispersion. Thereafter a dye assist of this invention in combination with a surface active agent can be added to form the finished dye bath. Typically, such dye baths contain from about 0.01 to 4.0 percent by weight dye and from about 1 to about 5 percent by weight dye assist. As previously indicated the particular dye assist mixture of this invention results in a higher saturation of color obtainable from a given concentration of dye than is possible with the use of the individual components alone.

The amount of thickening agent used varies with the particular application and dyeing equipment used. Typically the thickening agent is present from about 0.25 to about 3.0 percent by weight of the total dye bath.

The dyeing compositions of this invention, their preparation and their application are more specifically illustrated in the following examples.

EXAMPLE 1

Preparation of a Disperse Dye Composition and Dyeing Procedure

Tap water (400 ml), a 3 percent aqueous solution of water softener (Calgon, a product of Calgon Corp.; 5 ml), a 3 percent aqueous solution of monosodium phosphate (5 ml), and a 3 percent aqueous solution of sodium N-methyl-N-oleoyltaurate (5 ml) are charged into a one liter dye pot. The mixture is heated to 70°C and dye assist (1.5 grams) consisting of 40 parts by weight of butyl benzoate, 40 parts by weight of a compound of formula I, 15 parts by weight of the isopropylamine salt of dodecylbenzenesulfonic acid (Trident 3300, a product of Trylon Chemical Corp.) and 5 parts by weight of a polyoxyethylene derivative of castor oil (Trilox CO-40, a product of Tylon Chemical Corp.) is added thereto with stirring. A 15 gram swatch of woven polyester fiber (Dacron 54, a product of Du Pont) is then immersed in the bath contained in the dye pot for a period of about 10 minutes while maintaining the temperature at about 70°C. After this time the polyester swatch is removed from the bath and disperse dye (0.3 grams) dispersed in water (50 ml) is added to the bath with stirring until uniform. The polyester swatch is then returned to the dye bath and allowed to soak for a period of about 10 minutes at 70°C. After this time the temperature of the dye bath is raised to about 100°C over a period of 45 minutes and is maintained at that temperature for a period of about 1 hour with agitation. The dye bath is then cooled to 70°C and the polyester swatch is removed and is rinsed in warm water to remove dye liquor. The rinsed swatch is then immersed at 70°C in an aqueous wash solution (200 ml) containing 1% by weight of nonionic emulsifier (Triton X-100, a product of Rohm and Haas) and 1% by weight monosodium pyrophosphate for a period of about 10 minutes. After washing the swatch is rinsed with lukewarm tap water to remove washing solution. The swatch is then dried and is heat set at 193°C for a period of 3 minutes.

The procedures detailed in Example 1 were used to prepare numerous dye compositions utilizing a variety of disperse dyes. Woven polyester swatches (Dacron 54) were then dyed in accordance with the described procedures. Seven different polyester disperse dyes were utilized to prepare the following compositions:

| DYE COMPOSITIONS I to VII | |
|---|---|
| Disperse Dye Nos. 1 to 7 | 0.3 grams |
| Butyl Benzoate | 0.75 grams |
| Methyl Cellosolve Benzoate | 0.75 grams |

The seven dispersed dyes utilized were the following:
No. 1: CI Disperse Red 88, Genacron Red B, GAF
No. 2: CI Disperse Blue 79, Eastman Navy Blue 2R-LSW
No. 3: CI Disperse Yellow 42, C.I. No. 10338, Genacron Yellow GGLL, GAF
No. 4: Genacron Blue 3GL, GAF
No. 5: CI Disperse Red 88, Eastman Red B
No. 6: CI Disperse Blue 27, C.I. No. 60767, Eastman Blue GLF
No. 7: CI Disperse Blue 60, Latyl Brilliant Blue BG Seven additional dye compositions were also prepared utilizing the above described disperse dyes, the procedures of Example 1 and having the following composition:

| DYE COMPOSITIONS VIII to XIV | |
|---|---|
| Disperse Dye Nos. 1 to 7 | 0.3 grams |
| Butyl Benzoate | 0.75 grams |
| Ethyl Cellosolve Benzoate | 0.75 grams |

For comparative purposes dye compositions utilizing the seven described dyes and utilizing as the dye assist butyl benzoate, methyl collosolve benzoate and ethyl cellosolve benzoate alone were prepared having the following composition:

| DYE COMPOSITIONS XV to XXI | |
|---|---|
| Disperse Dye Nos. 1 to 7 | 0.3 grams |
| Butyl Benzoate | 1.5 grams |

| DYE COMPOSITIONS XXII to XXVIII | |
|---|---|
| Disperse Dye Nos. 1 to 7 | 0.3 grams |
| Methyl Cellosolve Benzoate | 1.5 grams |

| DYE COMPOSITIONS XXIX to XXXV | |
|---|---|
| Disperse Dye Nos. 1 to 7 | 0.3 grams |
| Ethyl Cellosolve Benzoate | 1.5 grams |

| DYE COMPOSITIONS XXXVI to XLII | |
|---|---|
| Disperse Dye Nos. 1 to 7 | 0.3 grams |
| Butyl Cellosolve Benzoate | 1.5 grams |

| -continued | |
|---|---|
| DYE COMPOSITIONS XLIII to XLIX | |
| Disperse Dye Nos. 1 to 7 | 0.3 grams |
| Butyl Benzoate | 0.75 grams |
| Butyl Cellosolve Benzoate | 0.75 grams |

As indicated polyester swatches were dyed with each of the aforedescribed dye compositions and the color intensity of the resulting dyed swatches was evaluated to illustrate the effectiveness of the dye compositions of this invention. Color intensity values were given to each dyed swatch by comparing the color intensity of the swatches to the color intensity of solutions of the individual dyes at six different concentrations. Solutions of the dyes were prepared by dissolving them in a 2 to 1 acetone-water mixture. Color intensity values ranging from 1 to 6 for the various dyes were assigned as shown in Table I. For comparison with the dyed polyester swatches each of the dye solutions were placed in 16 mm I.D. glass tubes.

TABLE I

| Dye No. | Concentration of Dye Weight Percent Color Intensity Value | | | | | |
|---|---|---|---|---|---|---|
| | 1 | 2 | 3 | 4 | 5 | 6 |
| 1 | 0.002 | 0.004 | 0.008 | 0.016 | 0.024 | 0.032 |
| 2 | 0.002 | 0.003 | 0.004 | 0.006 | 0.008 | 0.012 |
| 3 | 0.001 | 0.002 | 0.004 | 0.008 | 0.016 | 0.024 |
| 4 | 0.003 | 0.004 | 0.006 | 0.008 | 0.012 | 0.016 |
| 5 | 0.002 | 0.003 | 0.004 | 0.006 | 0.008 | 0.012 |
| 6 | 0.003 | 0.004 | 0.006 | 0.008 | 0.012 | 0.016 |
| 7 | 0.004 | 0.008 | 0.016 | 0.020 | 0.024 | 0.032 |

The color intensity values obtained for all prepared dye compositions are shown in Table II.

TABLE II

COLOR INTENSITY VALUES OF DYED POLYESTER FIBER

| Dye Compositions with Butyl Benzoate + Methyl Cellosolve Benzoate | | Dye Compositions with Butyl Benzoate + Ethyl Cellosolve Benzoate | | Dye Compositions with Butyl Benzoate | | Dye Compositions with Methyl Cellosolve Benzoate | | Dye Compositions with Ethyl Cellosolve Benzoate | | Dye Compositions without Dye Assist — Control | |
|---|---|---|---|---|---|---|---|---|---|---|---|
| No. I | - 4 | No. VIII | - 4 | No. XV | - 2 | No. XXII | - 3 | No. XXIX | - 3 | No. XXXVI | - 1 |
| No. II | - 4 | No. IX | - 5 | No. XVI | - 3 | No. XXIII | - 3 | No. XXX | - 3 | No. XXXVII | - 1 |
| No. III | - 5 | No. X | - 4 | No. XVII | - 2 | No. XXIV | - 3 | No. XXXI | - 4 | No. XXXVIII | - 1 |
| No. IV | - 5 | No. XI | - 5 | No. XVIII | - 3 | No. XXV | - 4 | No. XXXII | - 4 | No. XXXIX | - 1 |
| No. V | - 5 | No. XII | - 5 | No. XIX | - 4 | No. XXVI | - 2 | No. XXXIII | - 4 | No. XL | - 1 |
| No. VI | - 5 | No. XIII | - 4 | No. XX | - 2 | No. XXVII | - 3 | No. XXXIV | - 3 | No. XLI | - 1 |
| No. VII | - 6 | No. XIV | - 5 | No. XXI | - 3 | No. XXVIII | - 3 | No. XXXV | - 4 | No. XLII | - 1 |

It can be seen from the data presented in Table I that woven polyester fiber when dyed with dye compositions of the present invention utilizing as a dye assist the combination of butyl benzoate and a $C_1$-$C_4$ alkyl cellosolve benzoate exhibits a higher color intensity than polyester fiber dyed with identical compositions utilizing either butyl benzoate or a $C_1$-$C_4$ alkyl collosolve benzoate alone.

Other dye compositions within the scope of the present invention which can be prepared and used in accordance with the methods heretofore described are illustrated in the following examples.

| Example 2 | |
|---|---|
| Disperse dye | 1.0 gram |
| Methyl cellosolve benzoate | 10.0 grams |
| Butyl benzoate | 10.0 grams |

| Example 3 | |
|---|---|
| Disperse dye | 1.0 gram |
| Butyl cellosolve benzoate | 0.5 gram |
| Butyl benzoate | 0.5 gram |

-continued

Example 4
| | |
|---|---|
| Disperse dye | 1.0 gram |
| Ethyl cellosolve benzoate | 4.0 grams |
| Butyl benzoate | 1.0 gram |

Example 5
| | |
|---|---|
| Disperse dye | 1.0 gram |
| Methyl cellosolve benzoate | 1.0 gram |
| Butyl benzoate | 4.0 grams |

The dye compositions of this invention containing the combination of dye assists in addition to possessing the improved dyeing properties have also been found to be virtually odorless. This property is unexpected since one of the components, i.e. butyl benzoate, possesses an objectional odor.

The dyeing of polyester fibers with disperse dyes at atmospheric pressure is typically carried out in open vats. Many of the dye assists which are used in this dyeing process possess objectionable odor properties. These odor properties are a particular problem at the elevated temperatures at which dyeing is carried out. Accordingly, it is highly desirable to use a dye composition which is odorless at temperatures ranging up to about 100°C. Unexpectedly it has been found that the dye compositions of the present invention are virtually odorless whereas dye compositions which contain butyl benzoate as the sole dye assist possess objectionable odor.

The odor characteristics of the dye compositions of the present invention were compared to the odor characteristics of dye compositions containing as the dye assist butyl benzoate, methyl collosolve benzoate and ethyl cellosolve benzoate alone. The data are presented in Table III.

TABLE III

| DYE COMPOSITION | ODOR AT ROOM TEMPERATURE | DURING DYEING (100°C) |
|---|---|---|
| Butyl Benzoate 50% Methyl Cellosolve Benzoate 50% | Slight | Virtually Odorless |
| Butyl Benzoate 50% Ethyl Cellosolve Benzoate 50% | Slight | Virtually Odorless |
| Butyl Benzoate 50% Butyl Cellosolve Benzoate 50% | Slight | Virtually Odorless |
| Butyl Benzoate | Slight to Moderate | Moderate |
| Methyl Cellosolve Benzoate | Virtually Odorless | Virtually Odorless |
| Ethyl Cellosolve Benzoate | Virtually Odorless | Virtually Odorless |
| Butyl Cellosolve Benzoate | Slight | Virtually Odorless |

We claim:
1. A dye composition comprising one part by weight of a disperse dye and from one to twenty parts by weight of a dye assist consisting of a mixture of butyl benzoate and a compound of the formula

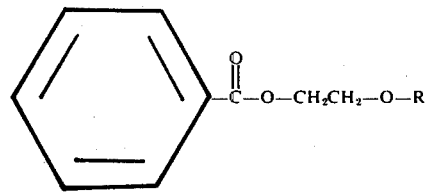

wherein R is alkyl of up to 4 carbon atoms, in a weight ratio of from 4:1 to 1:4.

2. The dye composition of claim 1 wherein R is methyl.
3. The dye composition of claim 1 wherein R is ethyl.
4. The dye composition of claim 1 wherein R is propyl.
5. The dye composition of claim 1 wherein R is butyl.

* * * * *